United States Patent
Schapendonk

(10) Patent No.: US 8,081,258 B2
(45) Date of Patent: Dec. 20, 2011

(54) EXTRACTION OF DATA FROM A TELEVISION SIGNAL USING AN ADAPTABLE SLICING LEVEL

(75) Inventor: Edwin Schapendonk, Oss (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 790 days.

(21) Appl. No.: 11/572,914

(22) PCT Filed: Jul. 18, 2005

(86) PCT No.: PCT/IB2005/052386
§ 371 (c)(1),
(2), (4) Date: Feb. 1, 2008

(87) PCT Pub. No.: WO2006/013494
PCT Pub. Date: Feb. 9, 2006

(65) Prior Publication Data
US 2008/0192148 A1    Aug. 14, 2008

(30) Foreign Application Priority Data
Jul. 29, 2004 (EP) .................................... 04103646

(51) Int. Cl.
*H04N 7/00* (2006.01)

(52) U.S. Cl. ........................ 348/465; 348/468

(58) Field of Classification Search .................. 348/465, 348/468, 466, 467, 464, 473, 477, 478, 461
See application file for complete search history.

(56) References Cited

U.S. PATENT DOCUMENTS

| | | | | |
|---|---|---|---|---|
| 4,723,165 | A * | 2/1988 | Bart | 348/532 |
| 5,404,172 | A * | 4/1995 | Berman et al. | 348/465 |
| 5,517,249 | A * | 5/1996 | Rodriguez-Cavazos et al. | 348/465 |
| 5,715,011 | A * | 2/1998 | Bramwell | 348/465 |
| 6,909,467 | B2 * | 6/2005 | Kuzumoto et al. | 348/468 |
| 6,912,009 | B2 * | 6/2005 | Orii | 348/465 |
| 7,046,298 | B2 * | 5/2006 | Kuzumoto et al. | 348/465 |
| 7,110,041 | B2 * | 9/2006 | Matsumoto | 348/468 |
| 7,463,308 | B2 * | 12/2008 | Yamasaki et al. | 348/465 |
| 2002/0129380 | A1 * | 9/2002 | Orii | 725/136 |

FOREIGN PATENT DOCUMENTS

| | | |
|---|---|---|
| EP | 1379086 | 1/2004 |
| GB | 1572489 | 7/1980 |
| GB | 2048618 | 12/1980 |
| GB | 2232856 | 12/1990 |
| WO | WO 93/18613 | 9/1993 |

* cited by examiner

*Primary Examiner* — Michael Lee
(74) *Attorney, Agent, or Firm* — DLA Piper LLP (US)

(57) ABSTRACT

From a television signal data such as teletext or closed caption data is extracted by slicing. A binary data signal is formed dependent on whether the television signal level is above or below a slicing level (S). The slicing level (S) is selected by defining a reconstructed data signal (D) with signal values equal to plus and minus an amplitude value relative to a middle level and transitions between these signal values at time points where the television signal crosses the slicing level. An auxiliary signal (R) is formed that contains the television signal (Vi) from which the reconstructed data signal (D) has been subtracted. A feedback loop is provided that adapts the amplitude value (A) to regulate a residual data signal amplitude in the auxiliary signal (R) to zero.

11 Claims, 1 Drawing Sheet

(12)                    US 8,081,258 B2

EXTRACTION OF DATA FROM A TELEVISION SIGNAL USING AN ADAPTABLE SLICING LEVEL

RELATED APPLICATIONS/PRIORITY CLAIMS

This application claims the priority benefits under 35 USC 119 of PCT International Application PCT/IB2005/052386, filed Jul. 18, 2005, which claims the priority to and benefit of European Patent Application No. 04103646.8 filed on Jul. 29, 2004.

The invention relates to a television signal receiver apparatus, and in particular to a slicer for recovering digital data that has been encoded in an analog television signal, for example for closed captions or for teletext. The invention also relates to a method of receiving a television signal.

It is well known to include digital data signals in analog television signals, for example for teletext and closed caption purposes. To remain compatible with the rest of the television signal, the digital data signal assumes selected signal levels within the range of signal levels that normally define the video image information in the television signal. Typically, the digital data signal is included during horizontal television line periods that are part of the vertical blanking interval (VBI). The digital data is included in the part of the horizontal line periods where normally (outside the VBI) video pixel information is included. Here the digital data signal satisfies the constraints imposed on video information: the digital data signal swing reaches from the "black level" (the lowest allowable level for video data, which lies above the zero level of the television signal) and a level below the peak white level. In this way it is ensured that the digital data signal does not disturb video processing circuits.

The digital data is recovered from the television signal by comparing the part of the television signal that contains the digital data signal with a slicing level. Dependent on whether the level of the television signal is above or below the slicing level a logic one or zero is recovered. For optimal detection results the slicing level should be midway between the maximum and minimum of the data signal levels, that is, at a selected level above the "zero" level of the television signal.

Proper selection of this slicing level presents problems in television receivers, because the selection is sensitive to deviations in the television signal, due to factors such as co-channel interference, unpredictable voltage offsets, echo's, noise etc. Various techniques for selecting the slicing level have been proposed.

One line of techniques measures the signal levels of two parts of the television signal that have known signal levels relative to the signal levels used for the digital data signal and derives the slicing level from these measured signal levels. US 2002/0129380, for example, shows detection of maximum and minimum levels of the television signal during a Clock Run In (CRI) part of the television signal (the CRI precedes the actual digital data signal in a horizontal line). In this case the slicing level is computed from the average of the maximum and minimum level. Another embodiment uses the signal level of the television signal pedestal at the start of a horizontal line and the maximum signal level during the CRI. European Patent Application No. 1 379 086 also derives the slicing level from minima and maxima in the CRI part. EP 1 379 086 recognizes that the minima and maxima can be affected by factors such as co-channel interference and noise. EP 1 379 086 proposes solutions such as elimination of minimum and maximum values that do not satisfy certain criteria or selection of the slicing level from a number of slicing levels that are used in parallel, on the basis of error detection results. However, a susceptibility to disturbances remains.

Another line of techniques determines the slicing level essentially from the average level of the digital data signal part of the television signal that remains after the variable part of the digital data signal has been removed. GB 2048618, for example, describes a technique wherein the slicing level is established using a reconstructed data signal that has a signal level "A" when the detected data is logic high and a signal level "−A" when the detected data logic low. Herein A is the estimated amplitude of the data signal swing. The reconstructed data signal is subtracted from the incoming digital data signal. The resulting difference signal corresponds the level of the incoming signal midway between the signal levels for logic high and logic low of the digital data signal. A time average of this difference signal could be used as the slicing level. In GB 2048618 the difference is integrated as a function of time and the integrand is used to regulate a slicing level in a feedback loop.

For this type of technique an estimate of the amplitude of the data signal swing is required. GB 2048618 describes how this amplitude can be estimated from the black level of the television signal (obtained from the signal before the start of the data signal) and the average signal level during the clock run-in (CRI) period. Thus, this technique also relies on measurements of the signal level at predetermined positions in the television signal. Consequently, amplitude estimation suffers from the same problems as direct determination of the slicing level from the average of the minima and maxima during the CRI period: errors occur due to co-channel interference etc.

GB 2232856 describes improved techniques for determining the amplitude. The absolute value of the television signal (i.e. plus the signal if the signal is positive and minus the signal if the signal is negative) is used to set the amplitude. However, this solution is still sensitive to errors such as unpredictable offset voltages and co-channel interference.

Among others, it is an object of the invention to provide for a method of processing television signals wherein a data slicing level is used that is less sensitive to disturbing factors.

The apparatus according the invention is set forth in Claim 1. An amplitude value is used to define a reconstructed data signal for the purpose of slicing level determination (the defined reconstructed data signal may generated explicitly or it may used implicitly as part of slicing level determination). According the invention the amplitude value is selected in a feedback loop that regulates a residual data signal amplitude in an auxiliary signal to zero. The auxiliary signal is obtained by subtracting the reconstructed data signal from the television signal. The residual data signal amplitude may be determined by means of synchronous detection, for example by multiplying the auxiliary signal with a signal that changes sign when the television signal crosses the slicing level. The invention may be implemented either using a time continuous feedback loop or using a time-discrete feedback loop or a combination of both. Preferably, a feedback loop with an integrating feedback is used to regulate the amplitude value. This has been found to work well for the television signals. However, alternatively other types of feedback filters may be used, for example a low pass filter that time averages the amplitude of the residual data signal amplitude.

In an embodiment a feedback loop is used that updates the amplitude value in the feedback loop once per horizontal television signal line that contains data signals, after the residual amplitude has been integrated or averaged over at least part of the line. Preferably, the amplitude value is updated at or near the end of integrating or averaging a data part of the line, or in a latter half of the line.

In an embodiment the subtraction circuit is arranged to form the auxiliary signal by subtracting both the slicing level and the reconstructed data signal from the television signal. In this way effects of middle level variations in the television signal on the selection of the amplitude selection are substantially eliminated. This has been found to increase the robustness of slicing against disturbances. Preferably, the auxiliary signal is used in a second feedback loop to regulate the slicing level so that the auxiliary signal is zero on average. Thus, the same auxiliary signal is used to regulate both the amplitude value and the slicing level in respective feedback loops, which increases the robustness against disturbances.

These and other objects and advantageous aspects of the invention will be described in more detail using non-limitative examples illustrated in the following figures.

Figure 1:
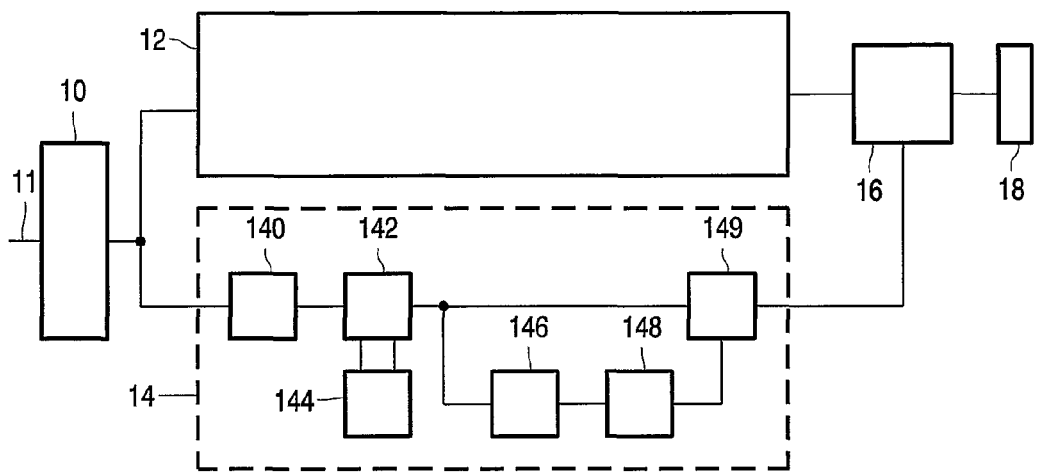
FIG. 1 shows a television receiver with a data slicing circuit.

FIG. 1 shows a television receiver with a data slicing circuit. The television receiver contains a receiver circuit 10, a video processing circuit 12, a data extraction circuit 14, a video modification circuit 16 and a display device 18. Receiver circuit 10 has an input for receiving a television signal e.g. from an antenna (not shown) or a cable network (not shown). Receiver circuit 10 has an output coupled to video processing circuit 12 and data extraction circuit 14 (receiver circuit 10 will typically have a further output coupled to an audio processing circuit (not shown), but this is not relevant for the invention). Video processing circuit 12 and data extraction circuit 14 are coupled to video modification circuit 16, which has an output coupled to display device 18.

In operation receiver circuit 10 receives a television signal and converts this signal into a stream of sample values that represent a video part of the television signal. Video processing circuit 12 processes the sample values to form a video output signal. Data extraction circuit 14 processes the sample values to extract digital data that has been encoded in the television signal for teletext and/or closed captions for example. Video modification circuit 16 uses the extracted data to add visual information to the video signal, or to replace part or whole of the video signal entirely with such visual information.

Figure 2:
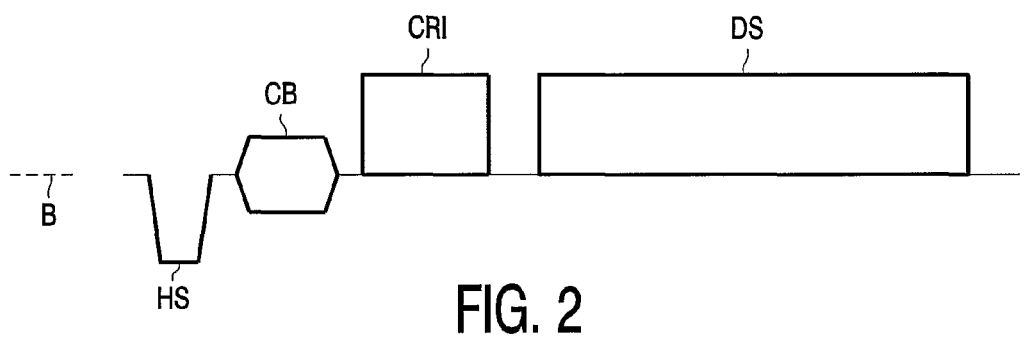
FIG. 2 shows a part of a television signal.

FIG. 2 schematically shows part of the television signal that is represented by the samples that are produced by receiver circuit 10. The signal corresponds to a horizontal line period. The signal successively contains a horizontal sync pulse HS, a color burst CB, a Clock Run In signal CRI and a data signal DS. The Clock Run In signal CRI and data signal DS are shown by means of boxes that envelope signal level variations in these parts of the television signal above a black level B. Typically, the CRI contains a series of oscillations of a predetermined frequency and amplitude and the data signal DS contains data dependent level changes of the same amplitude.

The signal processing involved with data extraction will now be discussed in more detail. For the sake of exposition an embodiment will be shown wherein interconnected circuit elements perform respective functions and exchange relevant signals. However, it should be appreciated that in practice many of the functions may be performed by a single signal processing circuit under control of a suitable program for realizing these functions.

The illustrated embodiment of data extraction circuit 14 contains a filter 140, a slicer 142 and an interpolator 149 successively in series. Furthermore data extraction circuit 14 contains an amplitude estimator 144 coupled to slicer 142. A zero-crossing detector 146 and a bit synchronizer 148 are coupled in series between slicer 142 and a control input of interpolator 149. In operation filter 140 low pass filters the video signal. Slicer determines whether the filtered signal is above or below a slicing level and produces a corresponding sliced output signal. Zero-crossing detector 146 and bit synchronizer 148 determines where bit information is located in the sliced output signal. Interpolator 149 extracts the bit information from the sliced output signal accordingly. Implementations of filter 140, zero-crossing detector 146, bit synchronizer 148 and interpolator 149 are known per se. These elements may each be implemented as a separate circuit, but alternatively the functions of part or all of the elements may be performed by a signal processor circuit that is programmed to perform the corresponding functions.

Figure 3:
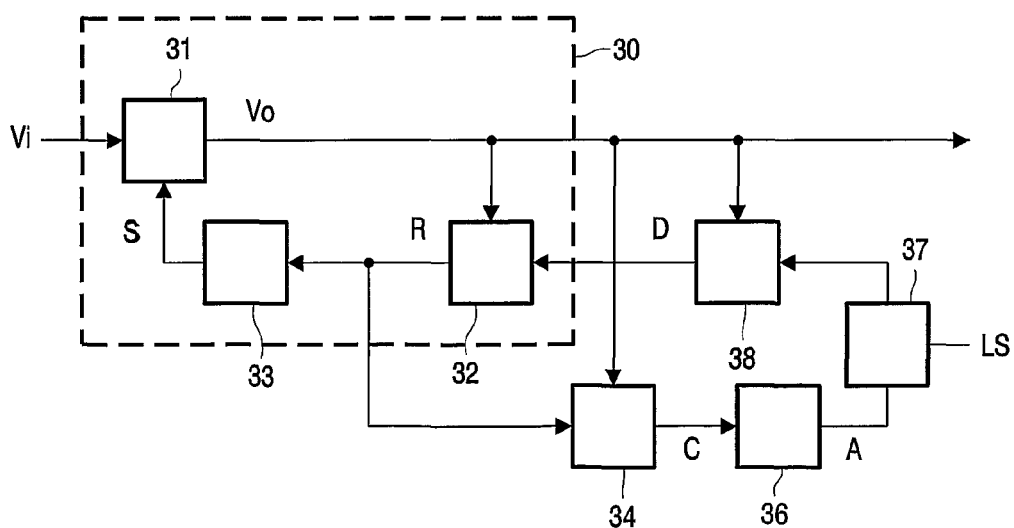
FIG. 3 shows a slicing level selection circuit.

FIG. 3 shows a slicing level selection circuit. The circuit contains a slicing level selection loop 30 with a first subtractor 31, a second subtractor 32 and an integrator 33. First subtractor 31 receives the television signal Vi from filter 140 (not shown) and produces an output signal Vo that indicates the difference between the television signal Vi and a slicing level S that first subtractor 31 receives from integrator 33 at a slicing level input.

$$Vo=Vi-S$$

Second subtractor 32 receives the output signal Vo and subtracts a reconstructed data signal D (which will be discussed further below) from the output signal to produce a resulting difference output signal R $$R=Vo-D$$

Ideally, when the slicing level S has the correct value and the reconstructed data signal D is correct, the resulting difference output signal R from second subtractor 32 has a zero average value. Integrator 33 integrates the resulting difference output signal R and supplies an integration result S to the slicing level input of first subtractor 31. The loop is arranged so that if the slicing level S is above or below its correct value respectively, the integration result drops and rises respectively. Thus the slicing level S is established in a feedback loop.

Typically this loop will be activated at least during processing of the data part DS of the television signal Vi. Optionally the loop is also activated during the processing of the clock run in part CRI. Thus, the television signal Vi in the CRI part is used to initialize the slicing level S for a horizontal line before the start of data part DS. This may be realized simply by allowing the circuit of FIG. 3 to operate when while the CRI part of the television signal is applied as Vi. Optionally, the reconstructed data signal D is replaced by a constant zero level signal D'=0, i.e. without reconstructed transitions. In that case the slicing level is regulated effectively by the feedback loop of first subtractor 31 and integrator 33. No switching reference signal D is needed in this case because the CRI signal has a predetermined shape which is known to be symmetric around the slicing level.

FIG. 3 also shows circuits for generating the reconstructed data signal D that second subtractor 32 subtracts from the output signal Vo of first subtractor 31. The circuits for generating the reconstructed data signal contain a residual signal rectifier 34, a further integrator 36, a sub-sampling circuit 37 and a toggle circuit 38 in a further feedback loop that serves to establish the amplitude of the data signal swing in the television signal. Residual signal rectifier 34 receives the output signal of second subtractor 32 at a data input and the output signal of first subtractor at a control input. Further integrator 36 receives the output signal of residual signal rectifier 34. Toggle circuit 38 receives the output signal of second integrator 36 via sub-sample circuit 37.

Toggle circuit 38 generates the reconstructed data signal D for subtraction by second subtractor 32. Toggle circuit 38 receives an input signal A that represents the amplitude of the data signal swing and outputs output signal values D that either equal the received amplitude or minus the received amplitude, dependent on whether the output signal of first subtractor 31 indicates that the television signal is above or below the slicing level respectively.

$$D = A * \mathrm{sign}(Vo)$$

(In this case the middle level of the signal D equals zero, but it should be understood that a different middle level does not significantly affect the operation because feedback loops are used). Residual signal rectifier 34 detects the amplitude of data related signal variations in the difference output signal R from second subtractor 32. This is done for example by multiplying this difference output signal with plus and minus one, dependent on whether the output signal of first subtractor 31 indicates that the television signal is above or below the slicing level respectively. In this case the output signal C of residual signal rectifier 34 equals $$C = R * \mathrm{sign}(Vo)$$

Ideally, when the correct amplitude signal is used in the reconstructed data signal D, output signal of first subtractor 31 R contains no residual data related signal swing on average. As a result residual signal rectifier 34 will output an average zero signal C in this case. However, if there is an deviation between the amplitude of the reconstructed data signal D and the amplitude of the actual data signal in Vo residual signal rectifier 34 outputs a result C whose average is proportional to the error.

Further integrator 36 integrates the output signal of residual signal rectifier 34 C and outputs the signal A that represents the amplitude to toggle circuit 38. Sub-sample circuit 37 samples the output of further integrator 36 each time at the end of the data part DS of a horizontal television line that contains a data signal. When the amplitude A corresponds to the amplitude in the television signal Vi the average output signal of residual signal rectifier 34 is zero so that the output signal A of further integrator 36 does not change. The feedback loop containing the residual signal rectifier 34, further integrator 36, sub-sample circuit 37, toggle circuit 38 and second subtractor 32 is arranged so that the output signal A of further integrator 36 rises and drops if too little or too much reconstructed data signal is subtracted by second subtractor 32 respectively.

In this way the amplitude A of the reconstructed data signal is controlled in a feedback loop, using data part of the actual television input signal Vi to control the amplitude. It should be appreciated that the feedback control of the amplitude can be realized in many different ways. For example, instead of sub-sampling the output of further integrator 36 only at the end of the data part DS, sub-sampling circuit 37 may be arranged to sample before the end of the data part DS (e.g. anywhere during the second half of the data part DS) or to sample the output for a plurality of time points during the data part D, e.g. for all time points for which samples of the television signal Vi are available in that data part D, or also in the CRI part.

As another example, a low pass filter may be inserted between toggle circuit 38 and second subtractor, to subject the reconstructed data signal D to a same type of filtering to as the television signal Vi has undergone, before application to second subtractor 32. This provides for an improved reconstruction of the data signal, which reduces the need to average out high frequency discrepancies between the actual data signal and the reconstructed data signal from the slicing level.

In the case wherein the slicing level S is initialized during the clock run in part CRI of a horizontal line by making the reference signal D'=0, the adjustment of the output signal A is disabled while the CRI signal is received.

Typically, the computation of the various signals is performed in a time discrete way, using sampled signal values. In this case the integration performed by integrator 36 corresponds to a summation:

$$A_i = A_{i-1} + \mathrm{factor} * C_i$$

Herein the index i distinguishes successive samples. The factor may be chosen to set the loop bandwidth. In the embodiment where sub-sampling circuit samples at the end of the data part case the loop bandwidth is set well below the frame frequency of the television circuit. In this way an amplitude is obtained that is insensitive to temporary perturbations. When a plurality of samples is taken during the data part D the loop bandwidth is preferably set so that effects that occur at the speed of changes between different data signal levels in the television signal Vi are filtered out.

Instead of an integrator a different feedback element may be used, such as a series arrangement of a low pass filter and an amplifier for example, so that a proportional non-integrating feedback loop is realized. Alternatively a combination of integration and proportional feedback may be used. The residual signal amplitude can also be detected in different ways, for example, instead of multiplication with the sign of the data signal Vo, an inverter may be used to produce an inverted signal "−C" and a multiplexer may be added to feed the signal C or the inverted signal −C to the input of integrator 36. Instead of multiplication with the sign of Vo to determine the signal C multiplication with other functions of Vo, such as multiplication with Vo itself may be used. Furthermore, although a digital time discrete feedback loop is preferred it should be realized that alternatively a time continuous feedback loop may be used.

In any of these ways the amplitude A of the reconstructed data signal is controlled in a feedback loop, using data part of the actual television input signal Vi to control the amplitude. Preferably, during operation of the feedback loop, amplitude selection is not dependent on signal levels at predetermined locations in the television signal Vi outside the data part. Of course signal levels at such predetermined locations may used to initialize the output of further integrator 36 (and/or integrator 33). Alternatively a standard initialization value may be used, or a value retained from a previous horizontal line in the television signal may be used for the initialization.

Furthermore, it should be appreciated that, although FIG. 3 illustrates the functional relationships of an embodiment of the operation of the feedback loop, alternative embodiments exist in which a different arrangement of functions may be used. For example, toggle circuit 38 may be integrated the circuit that implements second subtractor 32. As another example, a separate circuit may be used for forming the sliced signal and for determining the amplitude, that is, a separate subtractor circuit may be provided in parallel with first subtractor, to subtract the slicing level S from the television signal for use during data extraction. In this case, second subtractor 32 may be located in front of first subtractor 31, so that first subtractor 31 receives Vi-AD and outputs Vi-AD-S to first integrator 33 and residual signal rectifier 34. The functions of the elements of FIG. 3 may also be performed by one or more programmable signal processor circuit that is or are programmed to perform the corresponding functions.

The invention claimed is:

1. A television signal receiver apparatus comprising:
   a receiving circuit for receiving a television signal having a level;
   a data signal slicing circuit for forming a binary data signal dependent on whether the television signal level is above or below a slicing level; and
   a slicing level selection circuit for selecting the selected slicing level from a difference between television signal and a reconstructed data signal the slicing level selection circuit comprising: a data signal reconstruction circuit for defining the reconstructed data signal with signal values equal to plus and minus an amplitude value (A) relative to a middle level and transitions between these signal values at time points where the television signal crosses the slicing level a subtraction circuit for forming an auxiliary signal that contains the television signal from which the reconstructed data signal has been subtracted; a feedback loop arranged to adapt the amplitude value to regulate a residual data signal amplitude in the auxiliary signal to zero.

2. The television signal receiver apparatus according to claim 1, wherein the feedback loop contains an integrator for integrating the residual data signal amplitude as a function of time during at least a part of the auxiliary signal that derives from a part of the television signal that contains a data signal.

3. The television signal receiver apparatus according to claim 1, comprising a subsampling circuit in the feedback loop, arranged to adapt the amplitude value in the feedback loop once per horizontal television line that contains a data signal.

4. The television signal receiver apparatus according to claim 1, wherein the subtraction circuit is arranged to form the auxiliary signal by subtracting both the slicing level and the reconstructed data signal from the television signal.

5. The television signal receiver apparatus according to claim 4, comprising a further feedback loop arranged to adapt the slicing level to regulate at least a time average of the auxiliary signal to zero.

6. The television signal receiver apparatus according to claim 5, wherein the data slicing circuit comprises the subtraction circuit the slicing level selection circuit using the adapted slicing level to slice the data signal.

7. The television signal receiver apparatus according to claim 5, wherein the further feedback loop is arranged to initialize the slicing level at least for each particular horizontal line period that contains a part with a data signal during a clock run in part of the particular horizontal line period.

8. The television signal receiver apparatus according to claim 1, wherein the feedback loop comprises a residual amplitude detector that is arranged form a detection signal that corresponds to a product of the auxiliary signal and a reference signal that changes sign when the television signal crosses the slicing level.

9. A method of recovering digital data from a television signal, the method comprising:
   receiving the television signal;
   forming a binary data signal dependent on whether the television signal level is above or below a slicing level the slicing level being determined by:
   defining a reconstructed data signal with signal values equal to plus and minus an amplitude value relative to a middle level and transitions between these signal values at time points where the television signal crosses the slicing level;
   forming an auxiliary signal that contains the television signal from which the reconstructed data signal has been subtracted;
   providing a feedback loop that adapts the amplitude value to regulate a residual data signal amplitude in the auxiliary signal to zero;
   determining the slicing level from a difference between television signal and the reconstructed data signal.

10. The method according to claim 9, wherein the feedback loop contains an integrator for integrating the residual data signal amplitude as a function of time for at least a part of the auxiliary signal that derives from a part of the television signal that contains the data signal.

11. The method according to claim 9, the method adapting the amplitude value once per horizontal television line that contains the data signal.

* * * * *